Aug. 15, 1933.                L. M. HILE                1,922,808
                             BASKET HANDLE
                          Filed Feb. 13, 1931            2 Sheets-Sheet 1
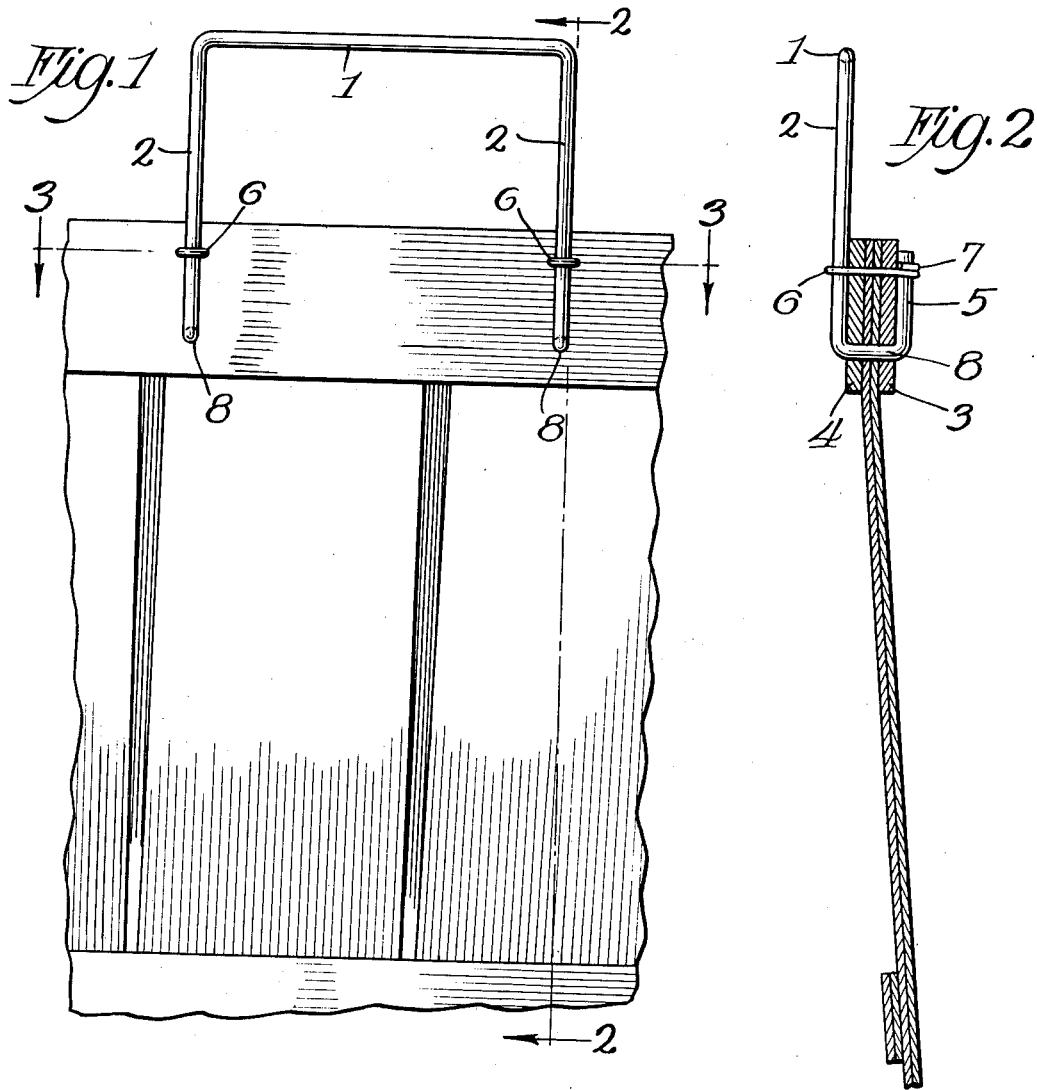
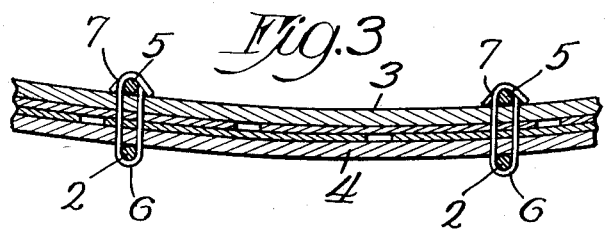
Inventor
L. M. Hile
By Arthur F. Durand  Atty.

Aug. 15, 1933.     L. M. HILE     1,922,808
BASKET HANDLE
Filed Feb. 13, 1931     2 Sheets-Sheet 2
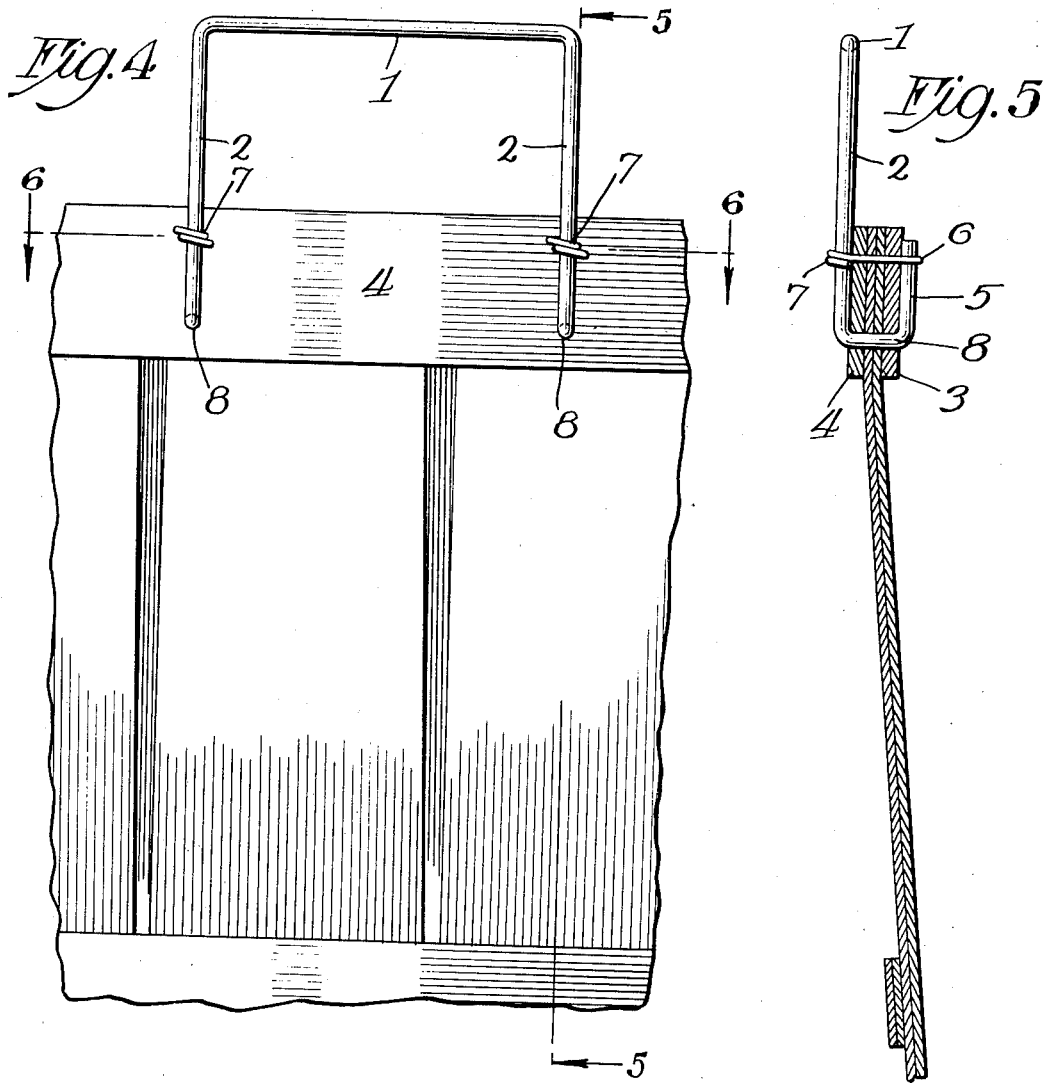
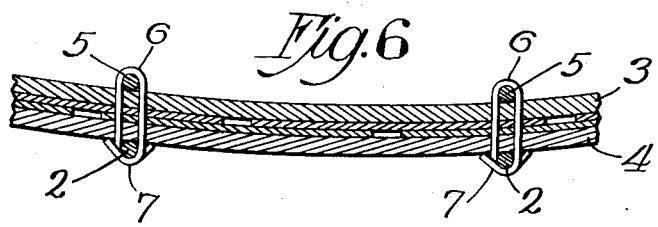
Inventor.
L. M. Hile
By Arthur F. Durand
Atty.

Patented Aug. 15, 1933

1,922,808

UNITED STATES PATENT OFFICE 1,922,808

BASKET HANDLE

Leslie M. Hile, Benton Harbor, Mich.

Application February 13, 1931. Serial No. 515,529

5 Claims. (Cl. 217—125)

This invention relates to basket handles, or handles for other receptacles, of the kind comprising a length of wire bent into bail shape and having its two lower end portions suitably attached to the rim of the basket or other receptacle.

Generally stated, the object of the invention is to provide an improved construction and novel arrangement whereby a handle of this kind is effectively fastened in place by means of staples that straddle portions of the handle, such staples being inserted through the rim of the basket or other receptacle.

It is also an object to provide certain details and features of construction and combinations tending to increase the general efficiency and the desirability of a basket handle of this particular character.

To the foregoing and other useful ends, the invention consists in matters hereinafter set forth and claimed and shown in the accompanying drawings, in which—

Fig. 1 is a side elevation of a basket handle embodying the principles of the invention, showing the adjacent portions of the basket or other receptacle to which the handle is attached;

Fig. 2 is a vertical section on line 2—2 in Fig. 1 of the drawings;

Fig. 3 is a horizontal section on line 3—3 in Fig. 1 of the drawings.

Fig. 4 is a view similar to Fig. 1, showing a somewhat different form of the invention.

Fig. 5 is a vertical section on line 5—5 in Fig. 4 of the drawings.

Fig. 6 is a horizontal section on line 6—6 in Fig. 4 of the drawings.

As thus illustrated, the invention comprises a wire handle having a horizontal top portion 1 and vertically disposed side portions 2, these side portions being formed with the end portions, which are inserted through the inner and outer hoops 3 and 4 of the basket or other receptacle, and which are then bent upwardly to provide inner portions 5, as shown. In this way, the handle is bail shaped in general form, and is provided with hook shaped depending side portions that are hooked through the rim of the basket or other receptacle in the manner shown and described.

To firmly attach the handles in place, additionally, staples 6 are inserted in position to straddle the side portions 2 of the handle, through the rim of the basket or other receptacle, and the inner end portions 7 of the staple are then bent and clinched around the inner portion 5 of the handle. In this way, in effect, each staple forms a tie-rod or bond between inner and outer portions of the handle. Thus the staples 6 are close enough to the portions 8, in the basket rim, to maintain the latter in firm position. In each case the tie rod is double, comprising both legs of the staple.

In this way, it will be seen, the operation of forming and inserting the handle itself is performed from the outside of the basket or receptacle, so that the wire ends of the handle are inserted inwardly through the rim of the basket or receptacle, and the retaining staples 6 are also inserted from the outside, inwardly, through the rim of the basket or receptacle.

With the foregoing construction and arrangement, the handle is firmly anchored in the receptacle, and is not liable to be forced or bent away from the outer side of the receptacle, such distortion of the handle being resisted not only by the stiffness of the handle wire itself, but also by the said staples 6 which tightly grip both the outer and inner portions of the hook shaped portions of the handle. Preferably, as shown, the staples 6 are disposed a substantial distance below the upper edge of the rim of the basket or receptacle, but near enough to this edge to provide a substantial length of handle wire from the bottom 8 of each hook to the staple 6 above, thus reducing the leverage when outward pressure is brought against the handle, tending to pull out the staples. But with the construction shown and described, which is illustrative of the invention, the handles are not thus liable to become distorted, and are so firmly anchored that they are not liable to pull out, for the staples 6 form strong links between the inner and outer portions of the handle.

In Figs. 4, 5, and 6 the construction is quite similar to that previously described, and is as follows:

As thus illustrated, the invention comprises a wire handle having a horizontal top portion 1 and vertically disposed side portions 2, these side portions being formed with the end portions, which are inserted through the inner and outer hoops 3 and 4 of the basket or other receptacle, and which are then bent upwardly to provide inner portions 5, as shown. In this way, the handle is bail shaped in general form, and is provided with hook shaped depending side portions that are hooked through the rim of the basket or other receptacle in the manner shown and described.

To firmly attach the handles in place, additionally, staples 6 are inserted in position to straddle the portions 5 of the handle, through the rim of the basket or other receptacle, and the outer end portions 7 of the staple are then bent and clinched around the outer portion 2 of the handle. Thus the handle is inserted inwardly through the basket rim, and the staples are inserted outwardly through the same rim. Thus each staple forms in effect a tie-rod or bond between two portions of the handle.

In this way, it will be seen, the operation of forming and inserting the handle itself is performed from the outside of the basket or receptacle, so that the wire ends of the handle are inserted inwardly through the rim of the basket or receptacle, but the retaining staples 6 are inserted from the inside, outwardly, through the rim of the basket or receptacle.

What I claim as my invention is:

1. A basket, handle constructed on the rim of a basket, comprising a bail-shaped wire handle having the legs thereof inserted through the inner and outer hoops of the basket rim, with the ends of the wire bent upwardly against one of said hoops, and staples inserted through the two hoops crosswise of portions of the handle and having their ends or points clinched over other portions of the handle, whereby each staple forms in effect a tie rod to clamp the two hoops tightly between integral inner and outer portions of the handle.

2. A structure as specified in claim 1, said handle being inserted inwardly through the hoops of the basket, and having its inner ends bent upwardly against the inner hoop.

3. A structure as specified in claim 1, said staples being disposed in position to straddle the upright side portions of the handle, and having their points clinched over the upturned end portions of the handle.

4. A basket handle constructed on the rim of a basket, comprising a bail-shaped wire handle having the legs thereof inserted inwardly through the inner and outer hoops of the basket rim, with the inner ends of the wire legs bent upwardly against the inner hoop, and staples inserted outwardly through the two hoops, crosswise of the inner end portions of the wire handle, with the outer ends or points of the staples clinched around the upright side portions of the handle, whereby the two hoops are tightly clamped between the inside and outside portions of the handle by the tie rod effect of said staples.

5. A basket handle constructed on the rim of a basket, comprising a bail-shaped wire handle having the legs thereof inserted inwardly through the inner and outer hoops of the basket rim, with the inner ends of the wire legs bent upwardly against the inner hoop, and staples inserted outwardly through the two hoops, crosswise of the vertically disposed inner end portions of the wire handle, with the points of each staple passing through the outer hoop at opposite sides of one side portion of the handle, and the points of each staple being clinched and turned back to the outer hoop.

LESLIE M. HILE.